(12) United States Patent
Rajavelu et al.

(10) Patent No.: US 7,444,408 B2
(45) Date of Patent: Oct. 28, 2008

(54) NETWORK DATA ANALYSIS AND CHARACTERIZATION MODEL FOR IMPLEMENTATION OF SECURE ENCLAVES WITHIN LARGE CORPORATE NETWORKS

(75) Inventors: Anand Rajavelu, Chandler, AZ (US); Christopher J. McConnell, Gilbert, AZ (US); Ben Choi, Chandler, AZ (US); Praveen Sampat, Chandler, AZ (US); Haodong Wu, San Jose, CA (US)

(73) Assignee: Intel Corporation (A Delaware Corporation), Santa Clara, CA (US)

( * ) Notice: Subject to any disclaimer, the term of this patent is extended or adjusted under 35 U.S.C. 154(b) by 945 days.

(21) Appl. No.: 10/883,478

(22) Filed: Jun. 30, 2004

(65) Prior Publication Data

US 2006/0031472 A1 Feb. 9, 2006

(51) Int. Cl.
*G06F 15/177* (2006.01)
(52) U.S. Cl. .................. 709/227; 709/224; 709/220
(58) Field of Classification Search ................ 709/224, 709/228, 227, 220–222
See application file for complete search history.

(56) References Cited

U.S. PATENT DOCUMENTS

| 7,076,393 | B2* | 7/2006 | Ormazabal et al. .......... 702/122 |
| 7,181,769 | B1* | 2/2007 | Keanini et al. ................ 726/23 |
| 2005/0075842 | A1* | 4/2005 | Ormazabal et al. .......... 702/188 |
| 2007/0143852 | A1* | 6/2007 | Keanini et al. ................ 726/25 |

* cited by examiner

*Primary Examiner*—Kenneth R Coulter
(74) *Attorney, Agent, or Firm*—Marger Johnson & McCollom PC

(57) ABSTRACT

A database stores information about known hosts, the applications or services they host, and the ports (known as confirmed ports) used by the applications/services. A static traffic analyzer analyzes traffic data and identifies packets communicating with (either sent to or received from) confirmed ports on hosts. A dynamic traffic analyzer analyzes the traffic data and identifies packets communicating with unconfirmed ports on hosts. A host identifier uses the resulting static and dynamic traffic to identify hosts for which firewall rules should be generated.

51 Claims, 12 Drawing Sheets

NETWORK DATA ANALYSIS AND CHARACTERIZATION MODEL FOR IMPLEMENTATION OF SECURE ENCLAVES WITHIN LARGE CORPORATE NETWORKS

FIELD

This invention pertains to data analysis, and more particularly to identifying external communication endpoints for network communications.

BACKGROUND

Where a business uses only one Local Area Network (LAN) to interconnect computers within the business structure, security is not an overly significant concern. The Information Technology specialist might be concerned with the potential for attacks coming from external networks (such as the Internet and other larger networks to which the business LAN is connected) and employees potentially bringing viruses onto computers by e-mail or disk. But typically, the IT specialist does not have to worry about legitimate business traffic crossing the boundary between the LAN and external networks. The IT specialist may implement simple rules in a firewall to protect the LAN from attack, because employees are not likely to access external services in the name of business too often.

All of this changes when the business grows sufficiently to justify two or more disparate LANs connected via a Wide Area Network (WAN), where one of the LANs is a highly secure network, but the other LAN is less secure. Now, legitimate work-related traffic may be crossing the boundary between the LANs. For example, the highly secure LAN may host a service, which may be used by computers in the less secure LAN.

For example, consider the situation shown in FIG. 1. FIG. 1 shows two local area networks (LAN) 105 and 110. LAN 105, as a highly secure LAN, is protected by firewall 115. Both LANs are connected to WAN 120 (LAN 105 via firewall 115).

Now, suppose that computer 125 on LAN 110 attempts to access services offered by host 130, on LAN 105. Because the communication originates outside LAN 105, firewall 115 must be configured to allow the communication to reach host 130. Currently, configuring the firewalls is a complicated process, requiring manual analysis of traffic, trial-and-error configuration, and lengthy implementation times.

Embodiments of the invention address these problems and others in the art.

DETAILED DESCRIPTION OF THE PREFERRED EMBODIMENT

Figure 1:
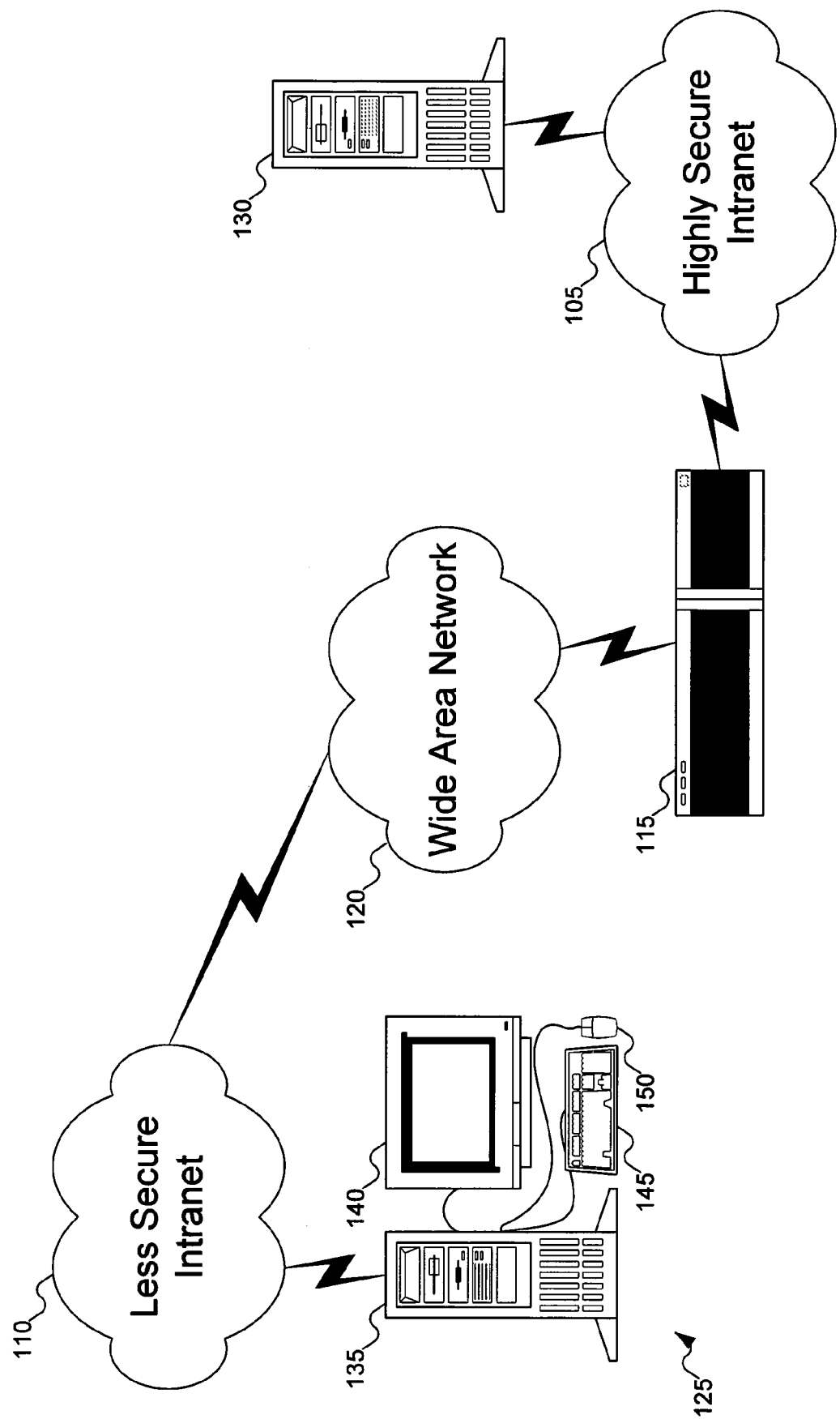
FIG. 1 shows local area networks (LANs) connected to an Wide Area Network (WAN), according to an embodiment of the invention.

The networks shown in FIG. 1 (Local Area Networks (LANs) 105 and 110 and Wide Area Network (WAN) 120) may each be any variety of network. For example, these networks may be Ethernet (e.g., Megabit or Gigabit Ethernet) networks, or wireless networks utilizing Bluetooth or any of the IEEE 802.11a/b/g standards, among others. (The Bluetooth standard may be found at "http:@@www.bluetooth.com@dev@specifications.asp," and the IEEE 802.11a-1999 (published in 1999), IEEE 802.11b-1999, IEEE 802.11b-1999/Cor1-2001 (published in 1999, corrected in 2001), and IEEE 802.11g-2003 (published in 2003) standards may be found online at "http:@@standards.ieee.org@catalog@olis@lanman.html" (to avoid inadvertent hyperlinks, forward slashes ("/") in the preceding uniform resource locators (URLs) have been replaced with at signs ("@")). In addition, each of these networks may be of a different type: there is no requirement that all the networks be consistent in type. Thus, one potential configuration could have one network as an Ethernet network, one as a Bluetooth network, and one as an IEEE 802.11 a/b/g network.

FIG. 1 shows a computer connected to each of LANS 105 and 110. FIG. 1 shows computer 125 as including computer case 135, monitor 140, keyboard 145, and mouse 150. But a person skilled in the art will recognize that computer system 125 may omit components shown and may include components not shown. For example, computer system 125 might omit mouse, and include a printer. In addition, although computer 130 is described as a server, a person skilled in the art will recognize that computer 130 may also be called a host for a service offered by computer 130, of which computer 125 is a client.

Both computer 125 and server 130 include a number of ports. Some of these ports are physical ports (e.g., network ports, parallel ports, serial ports, Universal Serial Bus (USB) ports, IEEE 1394 (FireWire®) ports, etc.); other ports are logical ports. (FireWire is a trademark of Apple Computer, Inc., registered in the U.S. and other countries.) Ports enable multiple parallel communications to occur across a network with a single machine: communications may be addressed to particular ports, and on different machines. That is, a single machine may have running applications communicating with multiple other machines, each application using a different port. Each port is separately addressable, and may be controlled by different applications. The ports are typically identified in fields in the communications between computer 125 and server 130. (In theory, more than one application may use a particular port, but in practice only one application uses a port at any given time.) A person skilled in the art will recognize when a reference to a "port" refers to a physical port or to the abstract port.

Standard ports used on most computers include: 21 (FTP: File Transfer Protocol), 23 (Telnet), 80 (HTTP: HyperText Transport Protocol), 110 (POP3: Post Office Protocol 3), 113 (Identification protocol), 443 (HTTPS: HTTP over Secure Sockets Layer (SSL)), and 5000 (UPnP: Universal Plug and Play). But many thousands of other ports exist (to be precise, there are currently 65,536 ports total), most of which are not dedicated to any particular service. Most of the standard ports are numbered between 0 and 1023, but a person skilled in the art will notice that some standard ports (e.g., port 5000) are outside this range. Despite being a slight misnomer, standard ports are called low ports; ports that are not low ports are called high ports.

In addition to standard ports such as those shown above, any individual machine may be hosting an application that is known to listen for connection requests on particular ports. For example, a server may be hosting an application that listens for connection requests on port 9164. Ports on which applications or services are known to listen (including standard ports) are called confirmed ports; ports that are not confirmed are called unconfirmed ports. Note that what ports may qualify as non-standard confirmed ports depends on what applications or services are known to the system: if a server hosts an application not known to the system, the listening port will be considered an unconfirmed port, even though there is a port mapper on the server.

It is also worth noting that confirmed ports are not host dependent: if any server hosts an application or service known to listen to a port, that port is considered a confirmed port, even though not all servers may be hosting the application or service. Thus, if an unknown application or service listens to the same port as a known application or service, or if a server uses that port for dynamic traffic (see below with reference to FIG. 2), traffic to that server will initially appear to be for the application or service that confirmed the port. The traffic analysis will have to address this possibility somehow.

Using computer 125 and server 130 as exemplary computers, when computer 125 wants to establish a connection to server 130, computer 125 uses a particular port on computer 125. As should be clear, this port is typically selected by the application wishing to establish the connection. The initial message requesting the connection also specifies a particular port on server 130. If, for the duration of the connection (that is, until either computer 125 or server 130 ends the connection), all communications between computer 125 and server 130 use the same ports as those specified in the initial message, then the connection is called a static connection (because the ports used by computer 125 and server 130 remain static); the traffic on this connection is called static traffic.

A person skilled in the art will recognize that computer 125 and server 130 may use different ports. That is, computer 125 may send a message using one port, and direct the message to a different port on server 130. This is quite common, although it is possible for computer 125 and server 130 to communicate using the same ports. A person skilled in the art will also recognize that computer 125 may establish multiple connections to different machines, and may even establish multiple connections to server 130. These multiple connections may overlap in time and may use the same ports. Finally, server 130 may also establish connections with other computers as well. (A person skilled in the art will recognize that, while it would be unusual, it is possible for computer 125 and server 130 to establish multiple overlapping connections using the same ports and protocols.)

In establishing connections, computer 125 and server 130 may use any of a number of protocols. A protocol is a way to encode the data in the communication for transmission to the other machine. Many standardized protocols may be used: two common protocols are the Transmission Control Protocol (TCP) and the User Datagram Protocol (UDP). And provided both computer 125 and server 130 recognize the protocol, non-standard protocols may also be used.

TCP is an example of a connection-based protocol. To establish a connection using a connection-based protocol, both computer 125 and server 130 communicate a particular sequence of packets, so that both sides are aware of the connection. In the case of TCP, the exchange is called a handshake and consists of three packets between computer 125 and server 130. (With other connection-based protocols, the exchange may involve a different number of set of packets.) Each packet includes a sequence number, with associates the packet to a particular connection. When communication is finished, the connection is closed (again, using a particular packet exchange). An advantage of a connection-based protocol is that it makes certain guarantees. For example, TCP guarantees delivery of packets, and that packets are received in the order sent. Electronic mail, web page loading, and file transfers are typically performed using TCP.

In contrast, UDP is a connectionless protocol. The data are sent to the recipient without any preliminaries to establish the connection. Connectionless protocols are often used where the overhead associated with establishing a connection using a handshake is expensive, or where reliable packet delivery is likely to be difficult. There is no initial exchange to establish the connection in a connectionless protocol, nothing ties any individual packet to a particular connection, and there is no exchange to end a connection. Of course, none of this is to say that the applications running on the client and server may not define a connection in their own way using the connectionless protocol: in fact, it is usual for the applications to define (in their own ways) a connection on top of the connectionless protocol. Examples of applications that use UDP include network management tools, routing protocols, and Domain Name System (DNS).

In an ideal environment, any message could be sent using a single packet. The real world, however, is not so accommodating. Often, a single message is split across multiple packets. It then becomes the responsibility of the machine receiving the communication to reassemble the original message from the individual packets. Because messages may be of any size, there is no guarantee or requirement that packets in each direction be interleaved, or in one-to-one correspondence. In addition, it may occur that no reply is needed to a particular message, in which case one machine might not send a packet to the other machine responsive to a message.

Normally, once a connection is no longer needed (that is, when computer 125 and server 130 no longer need to communicate with each other), the connection is terminated. For connectionless protocols, typically there are no required operations to terminate the connection (because it is connectionless), but there is a regular sequence used to terminate connection-based protocols. Of course, connections may also be terminated abnormally (e.g., if one of the communicating machines shuts down unexpectedly).

In contrast to static connections, it may happen that one (or both) of the machines involved in the connection wants to change the port used before the connection is terminated. For example, a computer offering remote procedure calls (RPCs) might want to change the port used for the connection. Such a server listens for connection requests at a particular port. When the server detects a connection request, it transfers the connection to a dynamic port, to limit the amount of traffic on the port to which the server listens. The server may use any other port for the dynamic traffic, or may limit the dynamic ports to a limited set of ports, as desired. This technique of transferring the connection from a static port to a dynamic port is called port mapping.

Usually, when a connection using dynamic traffic is established, it uses an unconfirmed port. But a person skilled in the art will recognize that the dynamic traffic may use a confirmed non-standard port, or even a confirmed standard port (although using a standard port might create confusion for the application or service that normally uses the standard port: typically in this situation, the server does not include the application or service normally using the standard port).

Figure 2:
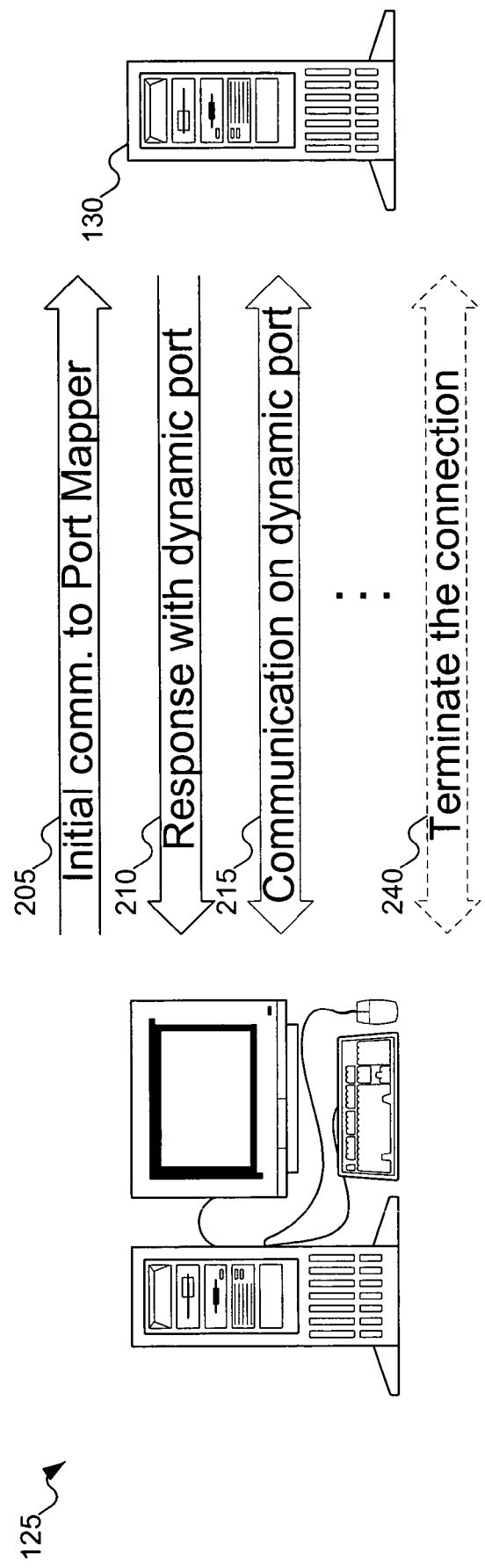
FIG. 2 shows two computers from the LANs of FIG. 1 establishing a dynamic connection, according to embodiments of the invention.

FIG. 2 shows computer 125 and server 130 establishing a dynamic connection. In communication 205, computer 125 (assumed in FIG. 2 to originate the connection request; a person skilled in the art will recognize how FIG. 2 may be modified if server 130 were to request the connection) contacts server 130 on the appropriate port for the port mapper. In communication 210, server 130 responds, specifying the port on which server 130 wants the dynamic connection. In communication 215, computer 125 and server 130 send information as needed between computer 125 and server 130. (Although communication 215 is shown as a single entry, a person skilled in the art will recognize that there may be multiple communications between computer 125 and server 130, as needed for the connection.) Eventually, in communication 125, the connection is terminated; depending on circumstances, either computer 125 or server 130 may terminate the connection.

This type of arrangement, where the server receives the initial connection packet on one port, but continues the connection on another port, is called a dynamic connection, and the traffic is called dynamic traffic. As should be apparent, the traffic is dynamic because the port (or protocol) used by the server changes. (Note that because computer 125 initiates the connection, computer 125 may pick whatever port it wants to use to communicate with server 130. It would be a rare (but theoretically conceivable) circumstance where computer 125 would initiate a connection with server 130, but request that server 130 call computer 125 back on a different port.) Even though the packets do not all connect to the same port on server 130, they are technically all part of the same connection. This fact will become significant later.

There are a few different ways in which the dynamic port may be specified. The most common situation has server 130 specifying the port on which the connection should be continued. Another way in which the connection could be dynamic would be if server 130 responds to the initial request from the dynamic port (that is, the reply does not come back from the port to which computer 125 sent the initial communication). In this situation, computer 125 has to be able to process the reply, even though it comes from a port other than the one to which computer 125 sent the initial connection request. A third possibility is for computer 125, as part of the initial connection request, to specify the dynamic port server 130 would use. For this technique to work, computer 125 has to know the ports which server 130 may use as dynamic ports. A person skilled in the art will recognize other ways in which a dynamic connection may be established.

The reader might assume that the protocol used is unchanged in any of the variations shown above in FIG. 2. For example, if UDP is used for the initial packet, then UDP is used for all future packets. In fact, this is not a limitation of embodiments of the invention. In directing the connection to a dynamic port, server 130 may also change to a different protocol. (In fact, server 130 may change the protocol used even if server 130 does not change ports. But if the protocol changes, then the connection to the port with the different protocol is considered dynamic traffic.)

Although the above discussion has centered around only a single computer communicating with a single server, a person skilled in the art will recognize that computer 125 and server 130 are merely exemplary. There may be more than one computer within LAN 110 of FIG. 1, and there may be more than one server in LAN 105. In addition, LANs 110 and 105 may each include servers and computers (that is, users of servers). There may also be more than two local corporate LANS, although from the perspective of the firewall for any of the local LANs, computers and servers fall into one of two categories: local and external. Finally, it is possible (although unlikely) that packets might cross a local LANs, even though the packet neither originates nor is destined for a computer or server on the local LANs). The firewall manages all packets that cross it, regardless of the circumstances.

The difficulty with dynamic traffic arises in how the analysis engine determines that the connection using dynamic traffic is not a new connection, but rather a continuation of an earlier connection using static traffic. For example, the dynamic port to use is typically specified (by either server 130 or computer 125) in the data of the packet. But generally, the data of network traffic is not analyzed because it is cost-prohibitive: how is the analysis engine to determine what data in the packets is pertinent and what is not without examining all of the packet data? And if server 130 establishes the dynamic connection by replying from the dynamic port, the analysis engine has no easy way to recognize that the first packet coming from the dynamic port is a reply and not the start of a new connection.

Now that the concepts of static and dynamic traffic have been explained, the procedure for analyzing traffic data may be explained. Initially, traffic data consists of many packets, each packet containing header information (such as source address and port, destination address and port, timestamp, and protocol) and data. This data may be collected in many ways: for example, using a packet sniffer. Generally, only the packet header information is used to perform the data analysis. While it is true that sometimes the data are pertinent (e.g., where the data store a dynamic port number for further communication), storing the data of all of the packets is an expensive proposition in terms of the space required, and would make the analysis process more time-consuming. As discussed above, the analysis is usually performed using only the packet header data.

The traffic data may be aggregated, eliminating any timestamp data. For example, if there are 15 connections between a particular pair of IP address/port combinations over the time spanned by the traffic, then this information may be aggregated to identify the connection endpoints and the number of connections. Aggregation reduces the scope of the data that needs to be analyzed, and enables determining rule priority (discussed further below).

Next, all of the hosts are identified from the traffic data. Hosts are classified as internal or external. Internal hosts are hosts that are within the local LAN protected by the firewall. All hosts that are not internal hosts are classified as external hosts. Note that this includes hosts in other LANs, even though these other hosts might be on another LAN of the same company. Thus, for example, referring back to FIG. 1, computer 125 is an external host with respect to LAN 105, even though LANs 105 and 110 may be owned by the same company. The hosts (internal and external) may be stored in databases for later reference, either separately or together.

The data may then be filtered. Filtering is useful for several reasons. First, if done correctly, filtering reduces the scope of the legitimate traffic data that needs to be analyzed, without affecting the significance of the traffic data. For example, to identify hosts for which traffic is permitted to cross a firewall does not require examining every packet to/from the host:

only an exemplary packet and the direction of the original connection is needed. Thus, any packets other than the initial packet add little or nothing to the traffic data, and may be filtered.

A person skilled in the art will recognize that for connection-based protocols like TCP, it is easy to identify the initial packet: the initial packet is the one starting the exchange to establish the connection. For connectionless protocols like UDP, the process is more difficult. The direction may be initially guessed by looking at the port numbers for the source and destination machines in the packet: if one of the machines in the packet is addressed using a confirmed port and the other machine is addressed using an unconfirmed port, the odds are high that the original connection request was directed to the machine with the confirmed port.

Second, filtering may eliminate any noise data. As an example of noise data, some computers use port scanners to try and locate machines/ports on the network available for communication. (Some port scanners operate for legitimate reasons; others are used by hackers to try and identify vulnerable machines to attack). Port scanners typically operate by sending out packets to every conceivable port number at an IP address: if the port scanner receives a response to any of the scans, then the port scanner knows that a computer exists at that IP address, and what ports are open for communication. There are many different ways in which port scanners may be identified. For example, any packet inbound to the network for which there is no earlier, corresponding outbound packet, may considered to be from a port scanner, and thus may be filtered. (A person skilled in the art will recognize that this definition of port scanning packets will also filter out any legitimate connection requests to internal hosts. But because the reply packet for the connection request is not filtered as part of the port scanning, the reply may be used to locate the connection. How this is handled is discussed further below.) Or, if a packet is inbound to a port on an internal host at roughly the same time as packets to other ports on the same internal host, all such packets may be considered to be from a port scanner, and thus may be filtered. A person skilled in the art will recognize other ways in which port scanners may be detected, so that port scanning traffic may be filtered.

After filtering, hosts that include port mappers are identified. As discussed above, port mappers are applications that listen to specific ports, and direct the communication to other, dynamic ports. Identifying hosts that use port mappers is preparatory to determining the dynamic ports on each host to open for traffic. As discussed above, port mappers (and host applications in general) fall into two groups: those using confirmed ports, and those using unconfirmed ports. Typically, the list of confirmed ports is collected prior to analysis, using lists of common applications and their associated confirmed ports.

It is worth noting that just because a port is confirmed does not mean that all traffic to or from that port relates to the application for which the port is confirmed. It may happen that a port mapper indicates a confirmed port number to be used for dynamic traffic. Thus, traffic that is to or from a confirmed port is not necessarily static traffic.

Once hosts with confirmed ports are identified, the analysis shifts to identifying static and dynamic traffic. First, packets communicating with confirmed ports are identified ("communicating with" being a term encompassing traffic in either direction: to or from the machine with the confirmed port) tentatively as static traffic. The analysis engine then verifies that the ports are confirmed for the specific machines to which the packets are addressed. That is, the analysis engine verifies that the machine to which a packet is addressed hosts the particular application or service that uses the confirmed port. Packets for which the port is not confirmed on the machine are not to be considered static traffic. The analysis engine also verifies that the protocol used for the packets is supported by the application that confirmed the port. If the application that confirmed the port does not support the protocol used in a packet, then the packet should not be considered static traffic. Once all static traffic has been identified, the static traffic may be rolled up and removed from the traffic data.

Next, dynamic traffic is determined. As discussed above, dynamic traffic is traffic between machines where one of the machines has starting using a new port or protocol from that used when the connection was established. Dynamic traffic is generally identified by checking that packets meet two conditions. First, the traffic is between two machines, at least one of which has a port mapping service. Second, both machines are using unconfirmed ports for the connection.

Unfortunately, while these conditions identify a large percentage of dynamic traffic, it is not completely accurate. First, these conditions would miss packets where the server has selected as a dynamic port a port that is actually a confirmed port for some application (such as, an application that is not hosted by the server). Second, these conditions also ignore situations where the protocol, but not the port, changes during the connection. Third, these conditions do not consider the possibility of the port mapper using only a range of dynamic ports, and so might include traffic that is not, in fact, dynamic traffic. And fourth, these conditions do not verify that there had been an earlier packet to the port mapper (without which there would have been no request for the application or service that uses dynamic ports). Thus, further refinement of the dynamic traffic is needed.

First, packets that remain in the traffic data (that is, packets that, at this point, have not been identified as either static traffic or dynamic traffic) are analyzed to see if they include a confirmed port on a machine that does not host the application or service that uses that port. Such packets are identified as dynamic traffic.

Second, packets that remain in the traffic data are analyzed to see if they include a confirmed port on a machine that hosts the application or service that uses that port, but use a protocol not supported by the application or service. Packets that meet this condition are also identified as dynamic traffic.

Third, the packets that have been tentatively identified as dynamic traffic are examined to see if the port on the machine with the port mapper is outside the range of dynamic ports used by the port mapper. Any packets that include a port that could not have been selected as a dynamic port by the port mapper are not dynamic traffic, and are returned the traffic data. Finally, each packet tentatively identified as dynamic traffic is compared with the packets in the static traffic to verify that there was a connection attempt made to the port mapper service on the machine from the other machine in the dynamic packet.

Once the dynamic traffic has been identified, directions are assigned to the dynamic traffic. This is because the firewall may permit outbound requests of a particular machine/port, but block inbound requests from the combination of machine/port. How packet directions may be determined was discussed earlier. The dynamic traffic may then be rolled up and removed from the traffic data.

Although the above description suggests that the refinement of the dynamic traffic requires a particular sequence, a person skilled in the art will recognize that no particular sequence is required. As long as the dynamic traffic is properly refined, the mechanics of the refinement are not important.

At this point, any traffic remaining is of packets that could not be identified as either static traffic or dynamic traffic. In other words, the reason for the packets is unknown. The traffic may be unresolved for any number of reasons. The unresolved traffic might be using applications or services that are unknown to the analysis engine. Or, the unresolved traffic might be some improper traffic that needs to be blocked. The unresolved traffic may be handled in any desired manner. It may be resubmitted for further analysis, or may be summarily blocked.

The rollups of the static traffic and dynamic traffic may be used in several ways. One use of the rollups is to generate firewall rules. The firewalls may be used in a simulator to see how effective they are in controlling the traffic data that was analyzed, and/or may be implemented in a firewall. Firewall rule generation may be an automatic process, or it may be performed manually by a firewall team, as desired.

One reason to simulate the use of the firewall rules over the traffic data is to determine firewall rule popularity. It may be expected that certain firewall rules will be used more often than others. By simulating the use of the firewall rules on the traffic data, popularities for the various firewall rules may be determined. The rules may then be prioritized within the firewall. By prioritizing the firewall rules, rules that are used more frequently may be considered first, making the firewall more efficient.

Figure 3A:
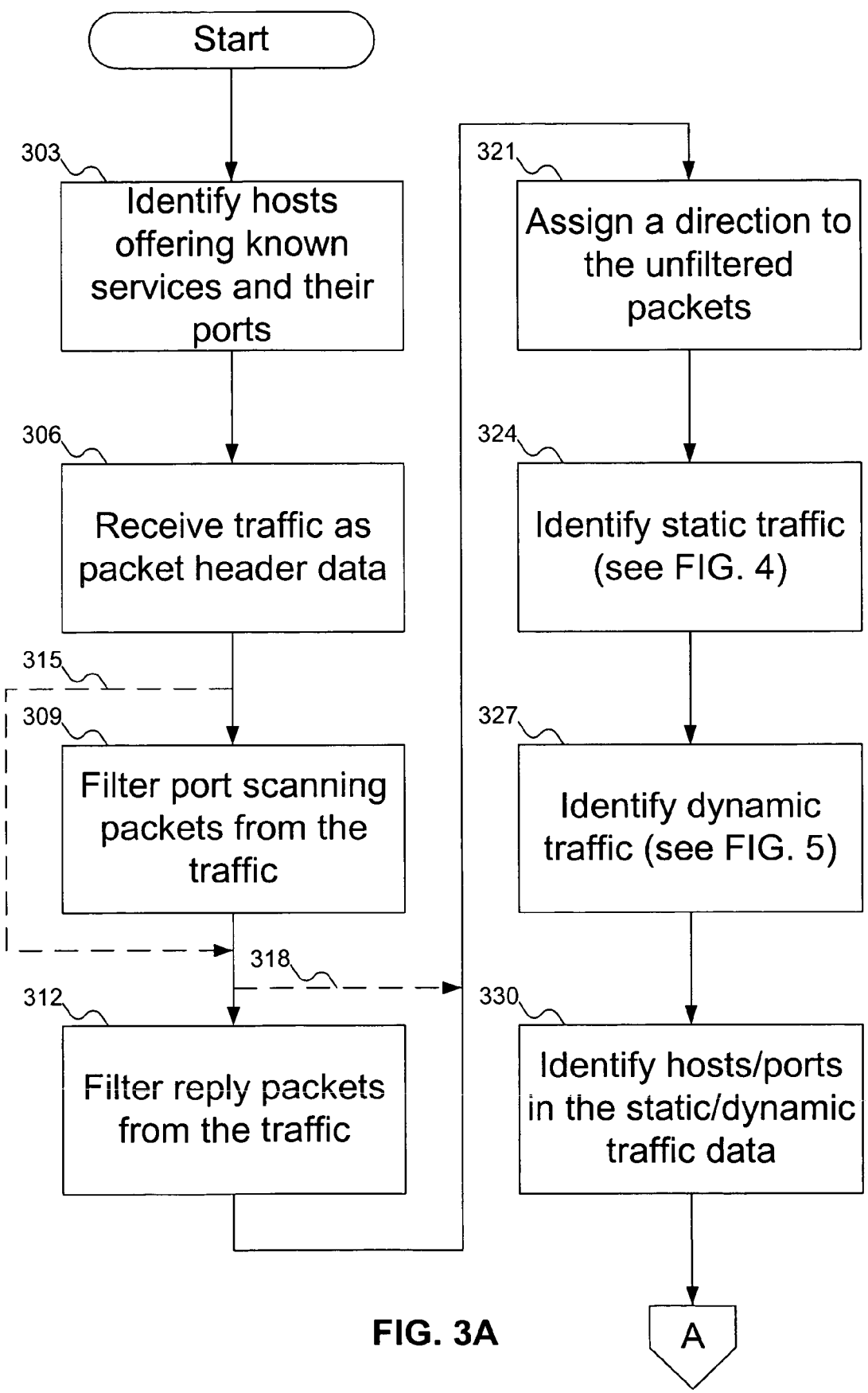
FIGS. 3A-3B show a procedure for performing traffic data analysis on the highly secure LAN of FIG. 1, according to an embodiment of the invention.
Figure 3B:
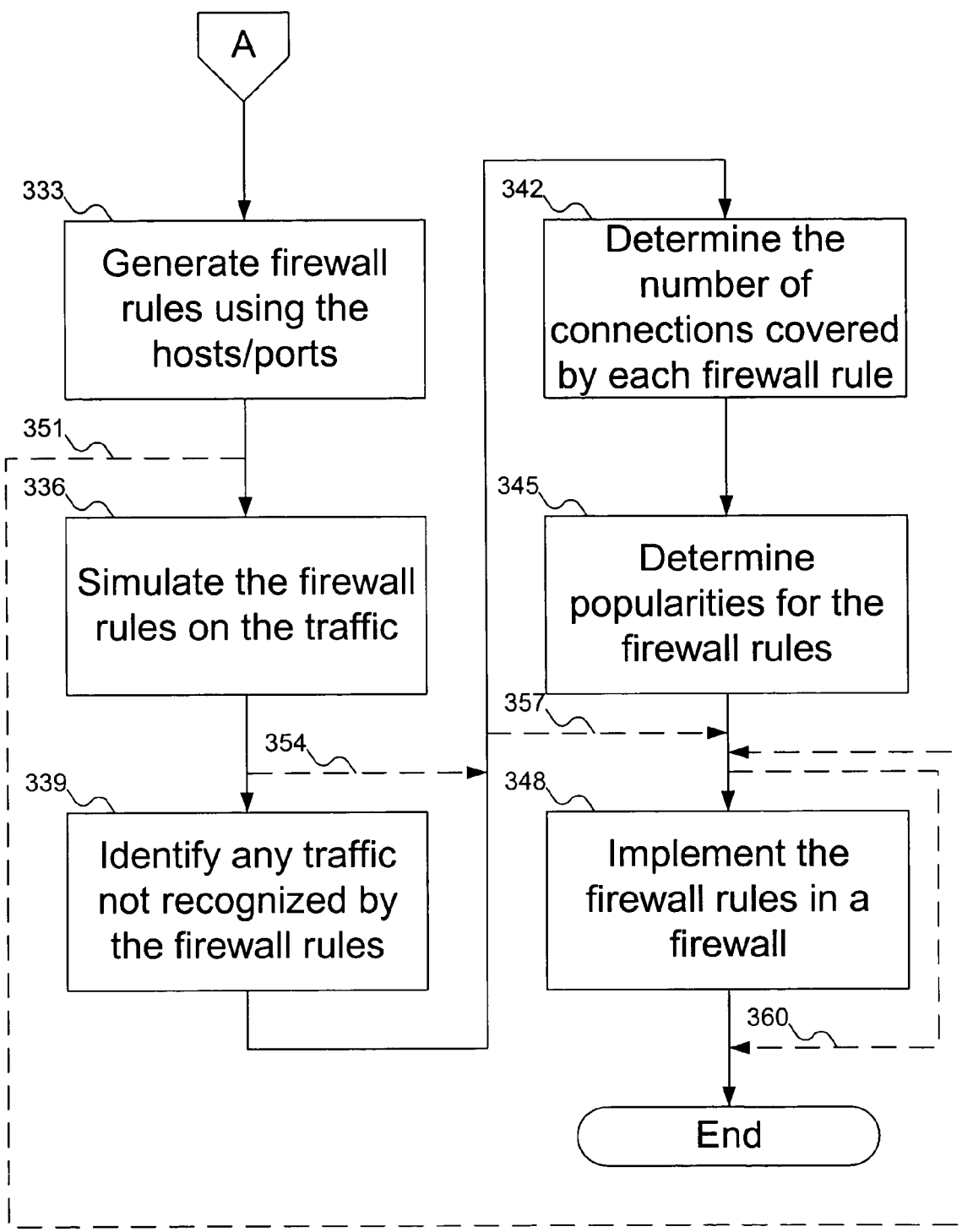

FIGS. 3A-3B show a procedure for performing traffic data analysis on the network of FIG. 1, according to an embodiment of the invention. In FIG. 3A, at block 303, the known hosts and the applications/services they offer are identified, along with the ports used by those applications/services. These ports form part of the list of confirmed ports, used later to identify the static traffic. At block 306, the analysis engine receives the traffic, as packet header data. As described above, a packet sniffer may be used for this purpose.

At blocks 309 and 312, port scanning packets and reply packets may be filtered from the traffic. Either or both of these blocks may be omitted, as shown by arrows 315 and 318. At block 321, directions are assigned to the unfiltered packets. As discussed above, the direction so assigned is the direction of the initial connection request, but the initial connection request packet might have been filtered in blocks 309 and/or 312. Thus, the direction of the packets may be "reversed" relative to the source and destination addresses in the packets.

At blocks 324 and 327, the static traffic and dynamic traffic are identified in the traffic. More detail about these operations may be found below with reference to FIGS. 4A-4B and 5A-5C. At block 330, hosts and ports are identified from the static traffic data and the dynamic traffic data.

At block 333 (FIG. 3B), firewall rules are generated using the hosts and ports. As discussed above, these firewall rules may be generated automatically or manually, as desired. At block 336, the firewall rules may be simulated on the traffic data, to see how well they perform. At block 339, packet header data in the traffic that was not processed by the firewall rules is identified. At block 342, the number of connections covered by each rule is determined, so that at block 345, the rules may be assigned popularities. Finally, at block 348, the rules may be implemented in a firewall.

As shown by arrows 351, 354, 357, and 360, not all of blocks 336-348 are necessary. Some may be omitted. Of course, to carry out some of the blocks requires that others be carried out as well. For example, rule popularities (blocks 342-345) may not be performed unless the firewall rules are simulated using the traffic data.

Figure 4A:
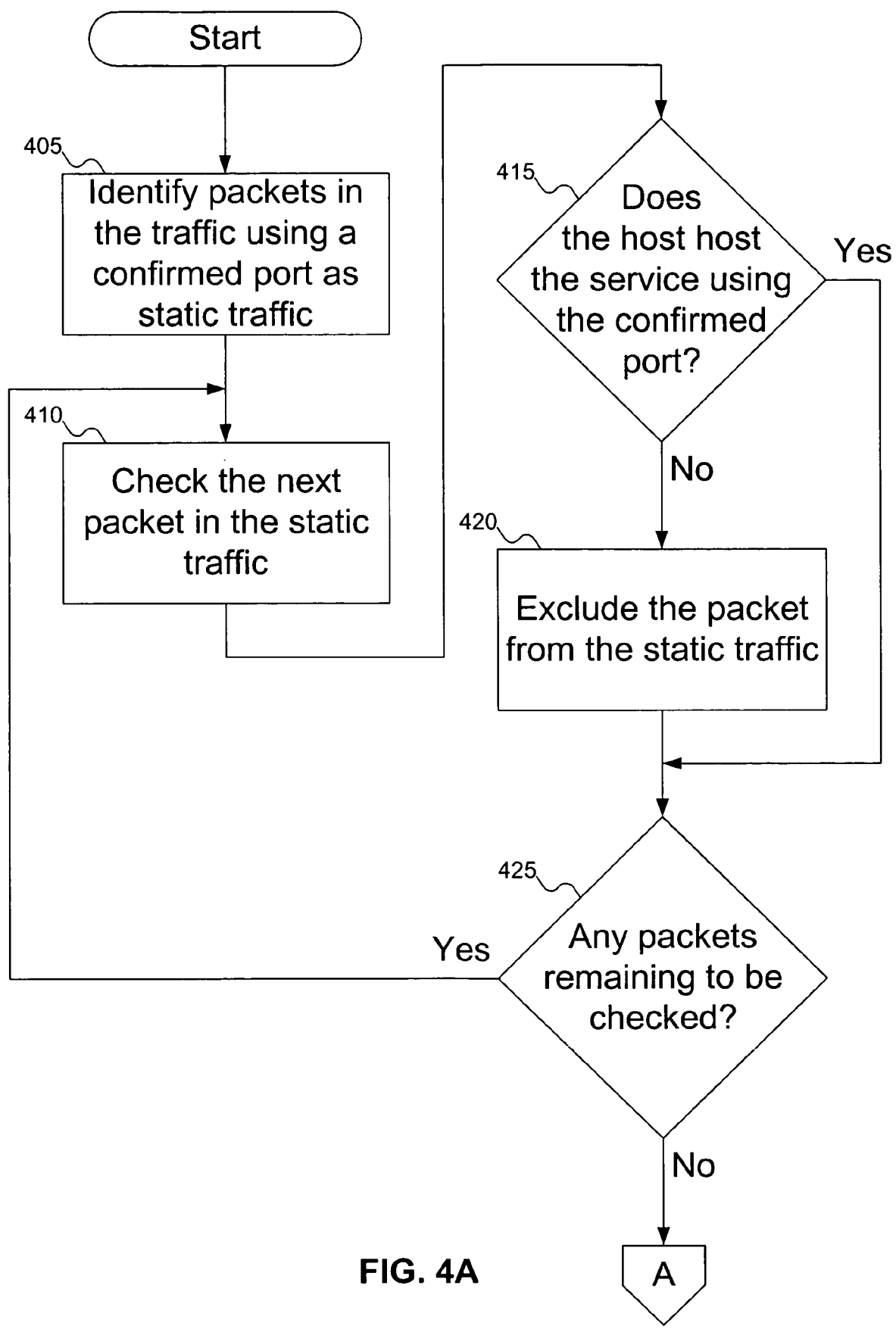
FIGS. 4A-4B show a procedure for identifying the static traffic data in the traffic analysis of FIGS. 3A-3B, according to an embodiment of the invention.
Figure 4B:
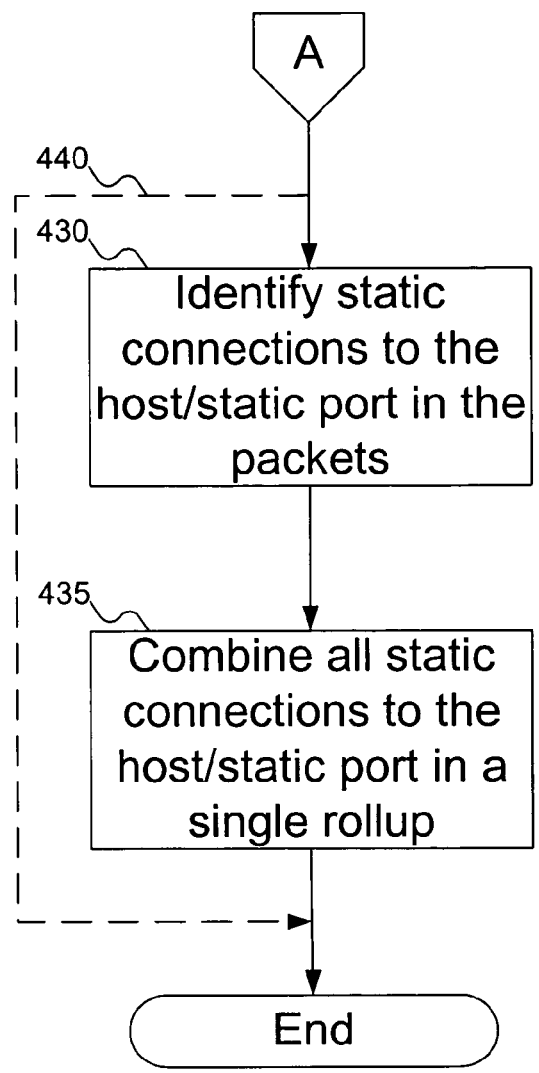

FIGS. 4A-4B show a procedure for identifying the static connection data in the traffic analysis of FIGS. 3A-3B, according to an embodiment of the invention. In FIG. 4A, at block 405, the analysis engine identifies packets addressed to a confirmed port as static traffic. At block 410, the analysis engine checks each packet one at a time to verify that the addressed host includes an application or service using the confirmed port. At decision point 415, the analysis engine acts on the verification. If the addressed host does not include an application or service using the confirmed port, then at block 420, the analysis engine excludes the packet from the static traffic. At block 425, the analysis engine determines whether all packets have been verified. If not, then control returns to block 410 to check another packet.

Otherwise, at block 430 (FIG. 4B), the analysis engine identifies connections to the static port on the host. As explained above, a connection is the complete interchange of packets between the two machines. For connection-based protocols, identifying all of the packets in a connection is not complicated, and only requires examining the data in the packet headers. For connectionless protocols, the analysis is slightly more complicated, requiring analysis of the timing of the packets. But as static connections retain the same protocols and ports, the analysis is fairly straightforward. Once the connections have all been identified, then at block 435, the connections are rolled up into a single data point, indicating the number of connections to the static port on the host. The static traffic may then be removed from the traffic data. As shown by arrow 440, blocks 430-435 may be omitted if desired.

Figure 5A:
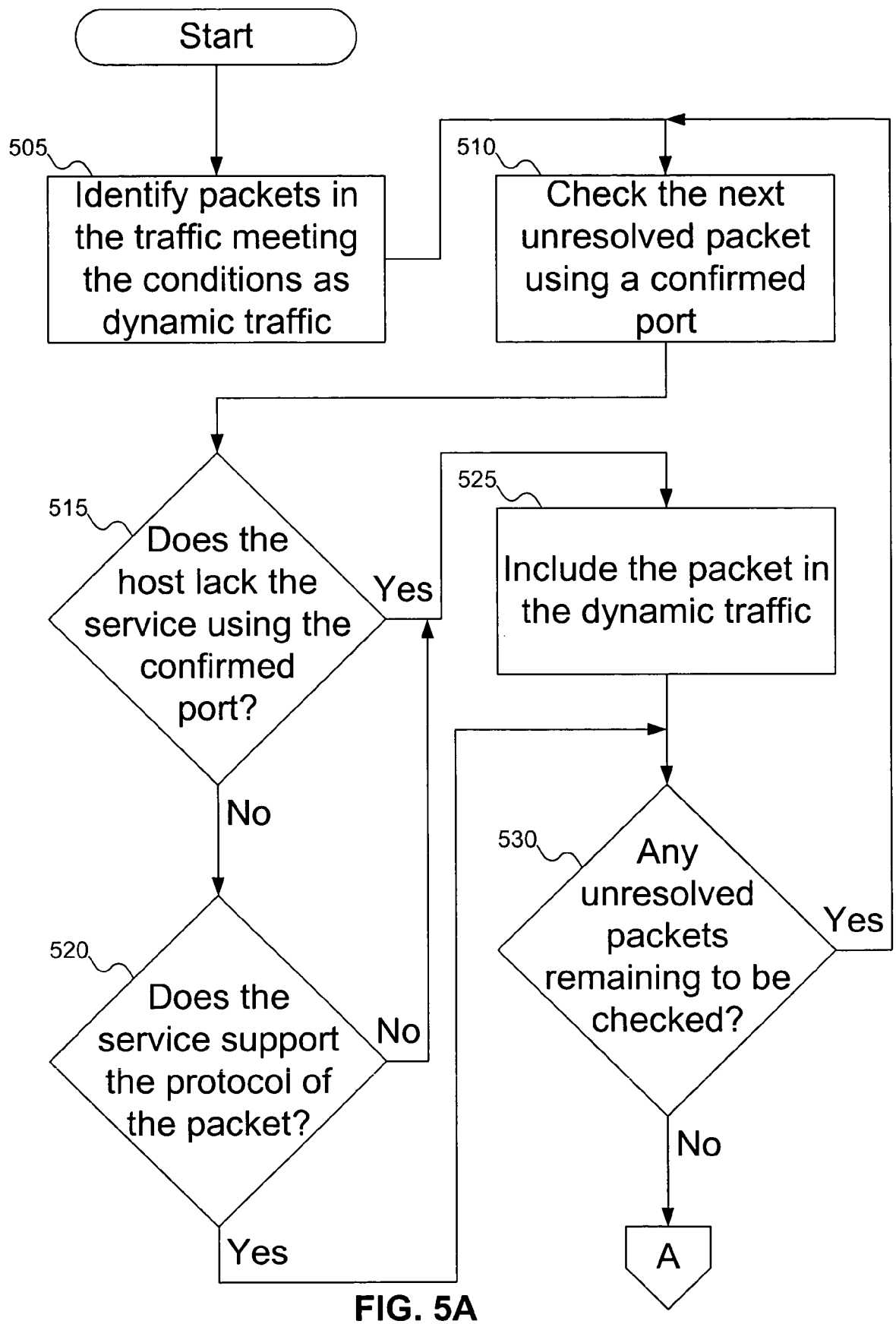
FIGS. 5A-5C show a procedure for identifying the dynamic traffic data in the traffic analysis of FIGS. 3A-3B, according to an embodiment of the invention.
Figure 5B:
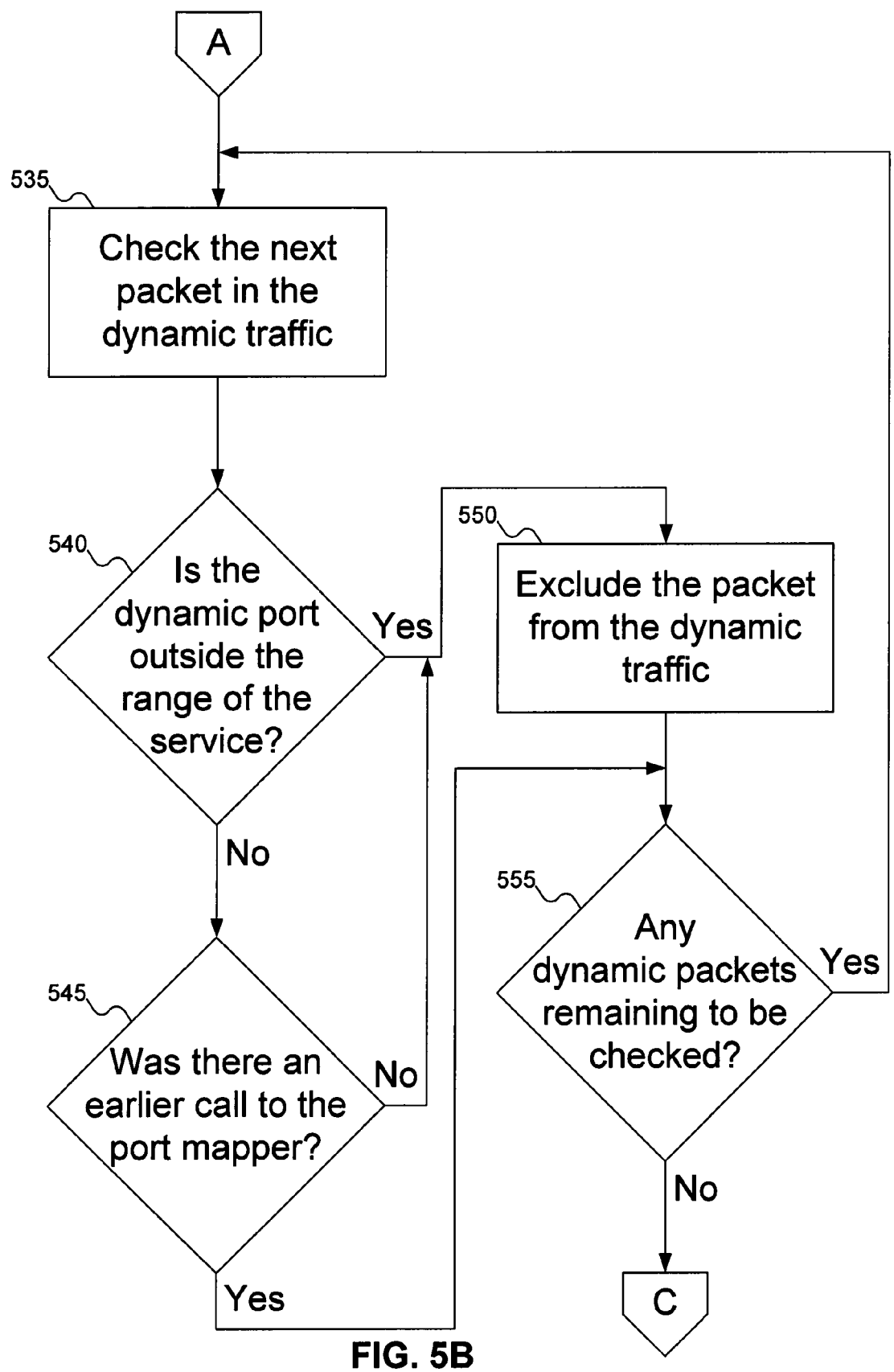
Figure 5C:
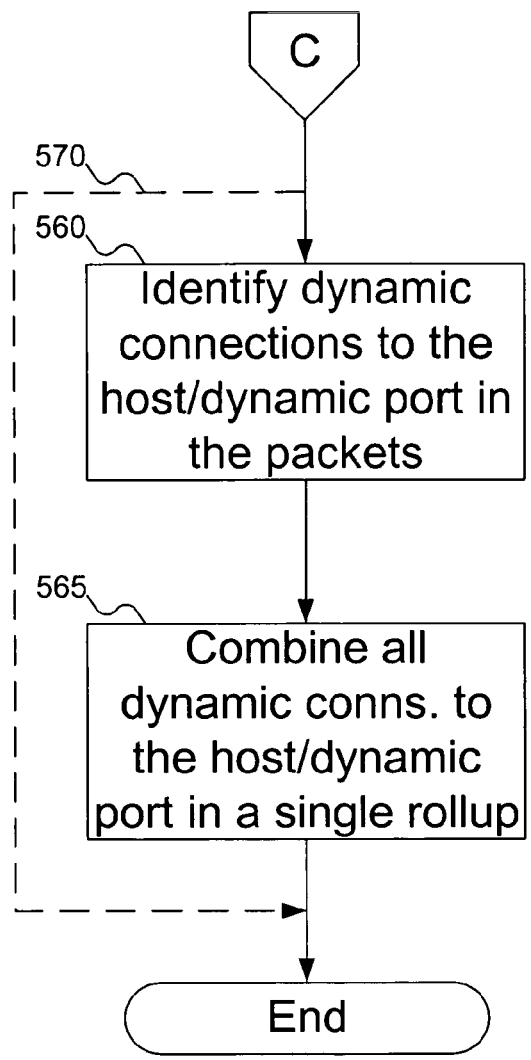

FIGS. 5A-5C show a procedure for identifying the dynamic connection data in the traffic analysis of FIGS. 3A-3B, according to an embodiment of the invention. In FIG. 5A, at block 505, the packets in the traffic that tentatively meet the conditions to be dynamic traffic are identified. As discussed above, these conditions are that one of the two machines includes a port mapper, and the ports used by both machines are not confirmed ports.

Block 510 begins the process of including any packets that should be treated as dynamic traffic but do not meet the base conditions. Note that at block 510, only three types of packets remain unresolved. The first type includes packets using confirmed ports on machines that do not host the applications or services using those ports. The second type includes packets using confirmed ports on machines hosting applications or services using these ports, but for different protocols. The third type includes packets where neither machine includes a port mapper (on neither the packets are not using confirmed ports on either machine). For the third type of packets, there is no way to determine what generated the traffic. So these packets may not be resolved, and so only packets of the first two types are considered. At block 510, an unresolved packet using a confirmed port is selected for analysis. At decision point 515, the analysis engine determines if the host lacks the application or service using the confirmed port. At decision point 520, the analysis engine determines if host supports the application or service using the confirmed port, but using a different protocol. If either of these tests is met, then at block 525, the packet is added to the dynamic traffic. At block 530, the analysis engine determines if there are any remaining packets to analyze. If so, control returns to block 510 to select another packet for analysis.

Block 535 (FIG. 5B) begins the process of excluding any packets from the dynamic traffic that may not be verified to be dynamic traffic. At block 535, a packet in the dynamic traffic is selected for analysis. At decision point 540, the analysis engine determines if the port used by the machine with the port mapper is outside the range of ports used by the port mapper. At decision point 545, the analysis engine determines whether there was an earlier call to the port mapper on the machine using the dynamic port. If the port is outside the range used by the port mapper, or if there was no earlier call to the port mapper, then at block 550, the packet is excluded from the dynamic traffic. At block 555, the analysis engine determines if there are any remaining packets to analyze. If so, control returns to block 535 to select another packet for analysis.

Otherwise, at block 560 (FIG. 5C), the analysis engine identifies connections to the dynamic port on the host. Once the connections have all been identified, then at block 565, the connections are rolled up into a single data point, indicating the number of connections to the static port on the host. The dynamic traffic may then be removed from the traffic data. As shown by arrow 570, blocks 560-565 may be omitted if desired.

Figure 6:
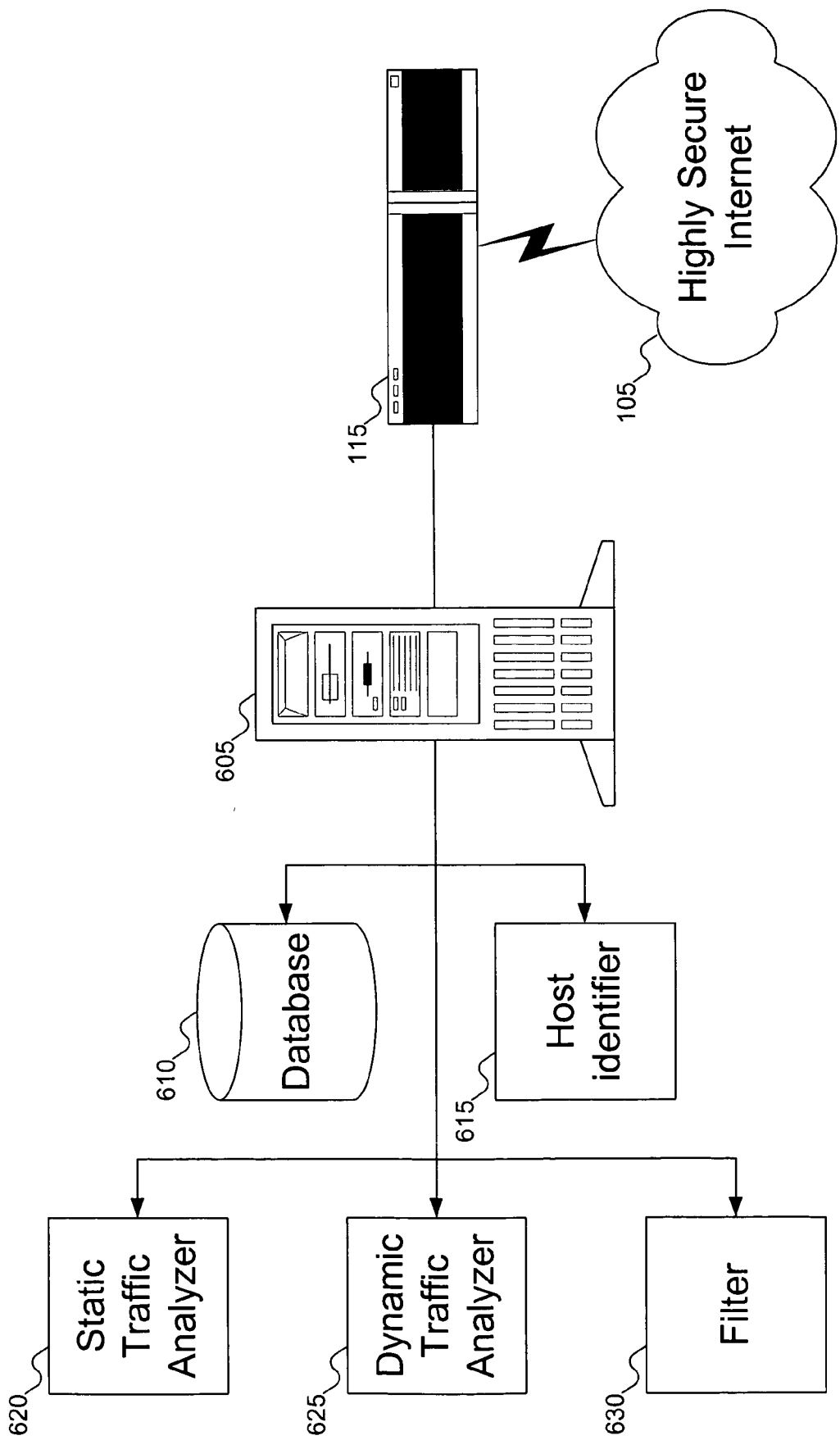
FIG. 6 shows a computer equipped to perform traffic analysis for the highly secure LAN of FIG. 1, according to an embodiment of the invention.

FIG. 6 shows a computer equipped to perform traffic analysis for one of the LANs of FIG. 1, according to an embodiment of the invention. In FIG. 6, computer 605 is shown supporting the analysis engine. FIG. 6 shows computer 605 connected to firewall 115, enabling a packet sniffer to capture the traffic data. But a person skilled in the art will recognize that computer 605 may be disconnected from any network and may act as a standalone machine. (The traffic data may be provided to computer 605 in many ways without requiring a network connection: e.g., by burning the traffic data onto a CD-ROM that may then be read on computer 605).

Computer 605 includes database 610, host identifier 615, static traffic analyzer 620, dynamic traffic analyzer 625, and filter 630. Database 610 stores data about known hosts and applications/services, such as confirmed port numbers, application/service names, etc. Host identifier 615 is responsible for identifying hosts (and ports on the hosts) that are used as external communication points. Host identifier operates on the results of the static and dynamic traffic analysis, using the identified static and dynamic traffic to indicate hosts and ports for which the firewall may be opened. Static traffic analyzer 620 and dynamic traffic analyzer 625 operate to identify the static and dynamic traffic from the traffic data, as discussed above. And filter 630 is used to filter the traffic data: e.g., to remove port scanner traffic and to remove reply packets.

Figure 8:
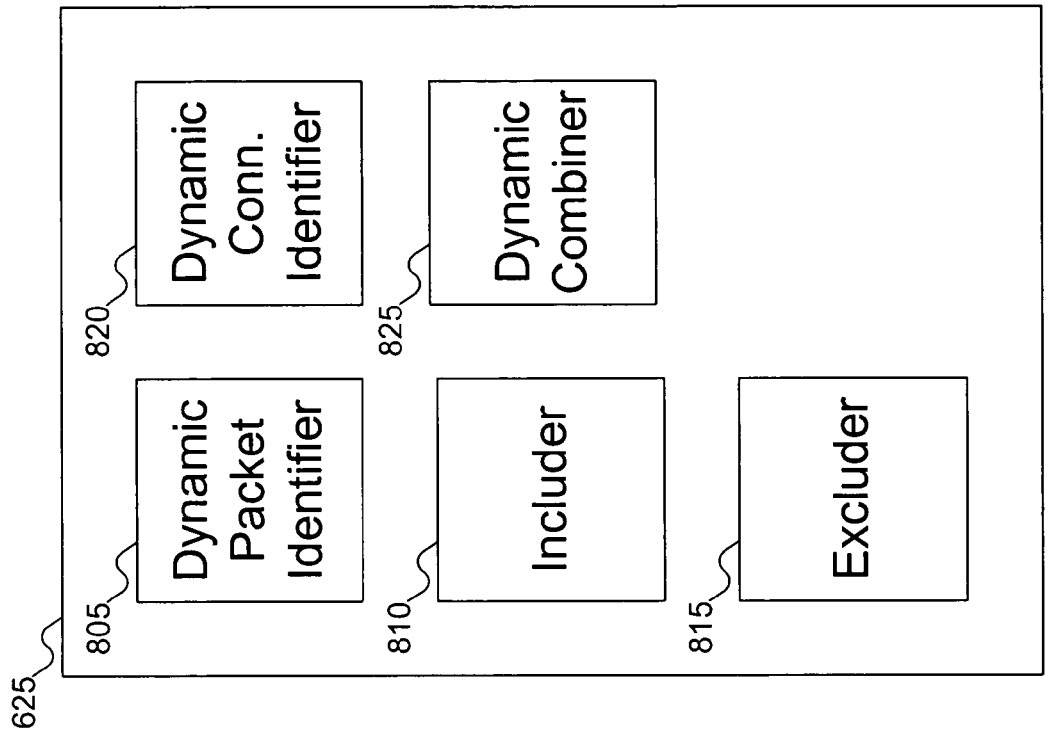
FIGS. 7 and 8 show details of the computer of FIG. 6, according to an embodiment of the invention.
Figure 7:
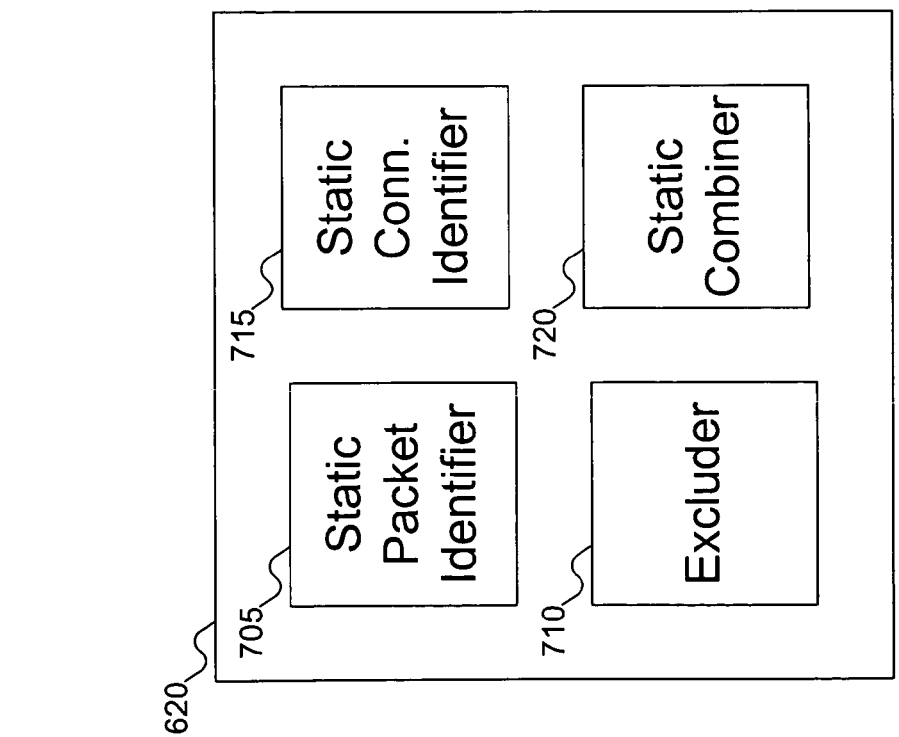

FIGS. 7 and 8 show details of the computer of FIG. 6, according to an embodiment of the invention. FIG. 7 shows details of static traffic analyzer 620. Static packet identifier 705 identifies packets that are likely to be static traffic (as discussed above, some packets might end up looking like static traffic but in fact be dynamic traffic or even unresolved traffic). Excluder 710 is responsible for excluding from the static traffic packets that are, in fact, not static traffic even though they might look like static traffic. Static connection identifier 715 identifies static connections to particular hosts (and their ports) for rollup by static combiner 720, which counts the number of connections to each host/port and stores the information more compactly.

FIG. 8 shows details of dynamic traffic analyzer 625. Dynamic packet identifier 805 identifies packets that are likely to be dynamic traffic (as discussed above, some packets might not look like dynamic traffic but are, and some packets might end up looking like dynamic traffic but in fact be unresolved traffic). Includer 810 is responsible for including packets in the dynamic traffic that do not look like dynamic traffic but are, in fact, dynamic traffic. Excluder 815 is responsible for excluding from the dynamic traffic packets that are, in fact, not dynamic traffic even though they might look like dynamic traffic. Dynamic connection identifier 820 identifies dynamic connections to particular hosts (and their ports) for rollup by dynamic combiner 825, which counts the number of connections to each host/port and stores the information more compactly.

Figure 9:
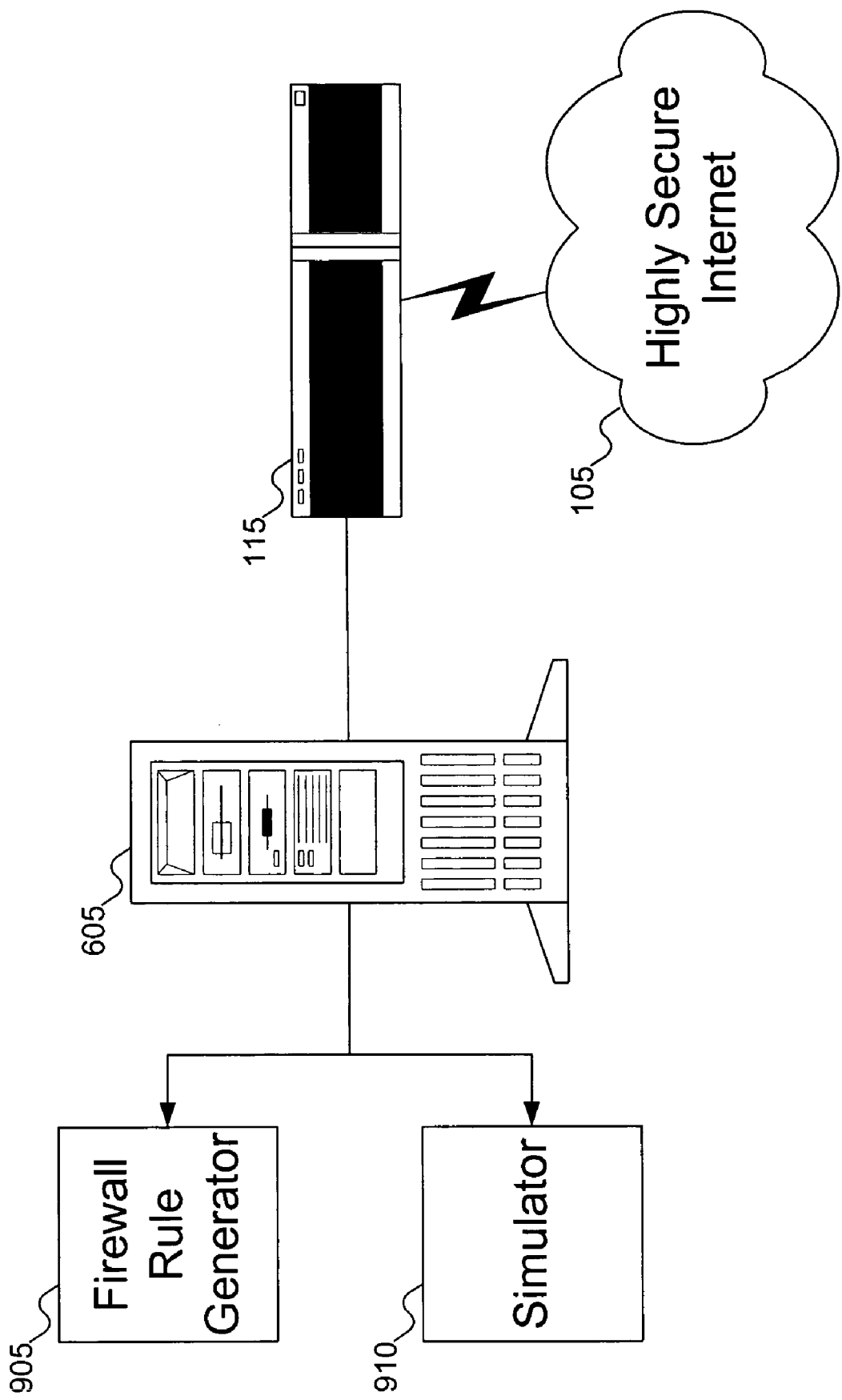
FIG. 9 shows the computer of FIG. 6 equipped to utilize the results of the traffic data analysis, according to an embodiment of the invention.

FIG. 9 shows the computer of FIG. 6 equipped to utilize the results of the traffic data analysis, according to an embodiment of the invention. Firewall rule generator 905 is responsible for using the information generated from the static dynamic traffic by the host identifier (of FIG. 6) and generating firewall rules. Simulator 910 may then take these generated firewall rules and simulate them on the traffic data to see how well the firewall rules operate.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus to analyze traffic on a network, comprising:
   a database to store a plurality of packets forming said traffic;
   a static traffic analyzer to identify static traffic in said plurality of packets, the static traffic analyzer including:
      a static packet identifier to identify at least one static packet in said plurality of packets as said static traffic, said static packet including an address and a static port, said address identifying a static host and said static port being a confirmed port;
      a static connection identifier to identify at least one static connection to said static port on said static host in said static traffic; and
      a static combiner to combine all of said static connections into a static connection rollup, said static connection rollup including a number of said static connections to said static port on said static host;
   a dynamic traffic analyzer to identify dynamic traffic in said plurality of packets; and
   a host identifier to identify at least one host as a communication point including said static host and said static port from said static traffic and said dynamic traffic.

2. An apparatus according to claim 1, wherein the static traffic analyzer further includes an excluder to exclude from said static traffic a packet including said address and said static port if said static host does not host an application or service associated with said confirmed port.

3. An apparatus according to claim 1, wherein:
   the dynamic traffic analyzer includes a dynamic packet identifier to identify at least one dynamic packet in the plurality of packets as said dynamic traffic, said dynamic packet including an address, a dynamic port, and a second port, said address identifying a dynamic host with a port mapper, and neither said dynamic port nor said second port being a confirmed port; and
   the host identifier is operative to identify said dynamic host and said dynamic port as said communication point.

4. An apparatus according to claim 3, wherein the dynamic traffic analyzer further includes:
   a dynamic connection identifier to identify at least one dynamic connection to said dynamic port on said dynamic host in said dynamic traffic; and
   a dynamic combiner to combine all of said dynamic connections into a dynamic connection rollup.

5. An apparatus according to claim 3, wherein the dynamic traffic analyzer further includes an excluder to exclude from said dynamic traffic a packet including said address and a third port if said third port is outside a range of dynamic ports associated with said port mapper.

6. An apparatus according to claim 3, wherein the dynamic traffic analyzer further includes an excluder to exclude from said dynamic traffic a packet including said address if said traffic lacks an earlier packet including said address and a confirmed port, said confirmed port associated with said port mapper.

7. An apparatus according to claim 3, wherein the dynamic traffic analyzer further includes an includer to include in said dynamic traffic a packet including said address and a confirmed port if said dynamic host does not host an application or service associated with said confirmed port.

8. An apparatus according to claim 3, wherein the dynamic traffic analyzer further includes an includer to include in said dynamic traffic a packet including said address, a confirmed port, and a protocol if said dynamic host hosts an application or service associated with said confirmed port that does not support said protocol.

9. An apparatus according to claim 1, wherein the database includes at least one known host, a known port on said known host, and a known service on said known host that may use said known port.

10. An apparatus according to claim 1, further comprising a firewall rule generator to generate a firewall rule for a firewall.

11. An apparatus according to claim 10, further comprising a simulator to simulate said traffic crossing said firewall using said firewall rule.

12. An apparatus according to claim 11, wherein the simulator is operative to determine a popularity for said firewall rule.

13. An apparatus according to claim 11, wherein the simulator is operative to identify at least one packet in said plurality of packets not recognized by said firewall rule.

14. An apparatus according to claim 1, further comprising a filter to filter from the plurality of packets a port scanning packet.

15. An apparatus according to claim 1, further comprising a filter to filter from the plurality of packets a reply packet, the reply packet responsive to an earlier packet.

16. A system, comprising:
   a first network, with at least one computer coupled to the first network;
   a connection between the first network and a second network; and
   a traffic analyzer, including:
      a database to store a plurality of packets forming traffic crossing the connection between the first network and the second network;
      a static traffic analyzer to identify static traffic in said plurality of packets, the static traffic analyzer including:
         a static packet identifier to identify at least one static racket in said plurality of packets as said static traffic, said static packet including an address and a static port, said address identifying a static host and said static port being a confirmed port;
         a static connection identifier to identify at least one static connection to said static port on said static host in said static traffic; and
         a static combiner to combine all of said static connections into a static connection rollup, said static connection rollup including a number of said static connections to said static port on said static host;
      a dynamic traffic analyzer to identify dynamic traffic in said plurality of packets; and
      a host identifier to identify at least one host as a communication point including said static host and said static port for at least a portion of said traffic from said static traffic and dynamic traffic.

17. A system according to claim 16, wherein:
the static traffic analyzer includes a static packet identifier to identify at least one static packet in said plurality of packets as said static traffic, said static packet including an address and a static port, said address identifying a static host and said static port being a confirmed port; and
the host identifier is operative to identify said static host and said static port as said communication point.

18. A system according to claim 17, wherein:
the dynamic traffic analyzer includes a dynamic packet identifier to identify at least one dynamic packet in the plurality of packets as said dynamic traffic, said dynamic packet including an address, a dynamic port, and a second port, said address identifying a dynamic host with a port mapper, and neither said dynamic port nor said second port being a confirmed port; and
the host identifier is operative to identify said dynamic host and said dynamic port as said communication point.

19. A system according to claim 16, further comprising a firewall to monitor the connection between the first network and the second network.

20. A system according to claim 16, further comprising a firewall rule generator to generate a firewall rule for a firewall.

21. A system according to claim 16, further comprising a filter to filter from the plurality of packets a port scanning packet.

22. A system according to claim 16, further comprising a filter to filter from the plurality of packets a reply packet, the reply packet responsive to an earlier packet.

23. A system according to claim 16, wherein:
the dynamic traffic analyzer includes a dynamic packet identifier to identify at least one dynamic packet in the plurality of packets as said dynamic traffic, said dynamic packet including an address, a dynamic port, and a second port, said address identifying a dynamic host with a port mapper, and neither said dynamic port nor said second port being a confirmed port; and
the host identifier is operative to identify said dynamic host and said dynamic port as said communication point.

24. A system according to claim 23, wherein the dynamic traffic analyzer further includes:
a dynamic connection identifier to identify at least one dynamic connection to said dynamic port on said dynamic host in said dynamic traffic; and
a dynamic combiner to combine all of said dynamic connections into a dynamic connection rollup.

25. A method implemented in hardware for analyzing traffic on a network, comprising:
receiving the traffic on the network as a plurality of packets;
identifying at least one static packet in the traffic as static traffic from the plurality of packets, the static packet including an address and a static port, the address identifying a static host and the static port being a confirmed port, including:
identifying at least one static connection to the static port on the static host in the static traffic; and
combining all of the static connections into a static connection rollup, the static connection rollup including a number of the connections to the static port on the static host;
identifying dynamic traffic from the plurality of packets; and identifying at least one port on one host in the static traffic data and the dynamic traffic data as a communication point including the static host and the static port for at least a portion of the traffic.

26. A method according to claim 25, wherein identifying static traffic further includes excluding from the static traffic a packet including the address and the static port if the static host if the static host does not host an application or service associated with the confirmed port.

27. A method according to claim 25, wherein:
identifying dynamic traffic includes identifying at least one dynamic packet in the plurality of packets as the dynamic traffic, the dynamic packet including an address, a dynamic port, and a second port, the address identifying a dynamic host with a port mapper, and neither the dynamic port nor the second port being a confirmed port; and
identifying at least one port on one host further includes identifying the dynamic host and the dynamic port as a second communication point.

28. A method according to claim 27, wherein identifying dynamic traffic further includes:
identifying at least one dynamic connection to the dynamic port on the dynamic host in the dynamic traffic; and
combining all of the dynamic connections into a dynamic connection rollup.

29. A method according to claim 27, wherein the identifying dynamic traffic further includes excluding from the dynamic traffic a packet including the address and a third port if the third port is outside a range of dynamic ports associated with the port mapper.

30. A method according to claim 27, wherein the identifying dynamic traffic further includes excluding from the dynamic traffic a packet including the address if the traffic lacks an earlier packet including the address and a confirmed port, the confirmed port associated with the port mapper.

31. A method according to claim 27, wherein the identifying dynamic traffic further includes including in the dynamic traffic a packet including the address and a confirmed port if the dynamic host does not host an application or service associated with the confirmed port.

32. A method according to claim 27, wherein the identifying dynamic traffic further includes including in the dynamic traffic a packet including the address, a confirmed port, and a protocol if the dynamic host hosts an application or service associated with the confirmed port that does not support the protocol.

33. A method according to claim 25, wherein identifying at least one port on one host includes identifying at least one service using the port on the host in the traffic.

34. A method according to claim 25, further comprising generating at least one firewall rule to control traffic across a firewall coupled to the network.

35. A method according to claim 34, further comprising implementing the firewall rule in the firewall.

36. A method according to claim 34, further comprising simulating the firewall rule using the traffic on the network.

37. A method according to claim 36, further comprising identifying traffic not recognized by the firewall rule.

38. A method according to claim 34, further comprising:
determining a number of connections in the traffic covered by the firewall rule; and
setting a popularity for the firewall rule based on the number of connections.

39. A method according to claim 25, further comprising filtering at least one filtered packet from the traffic.

40. A method according to claim 39, wherein filtering at least one filtered packet includes filtering out a port scanning packet from the traffic.

41. A method according to claim 39, wherein filtering at least one filtered packet includes filtering out a reply packet, the reply packet responsive to an earlier packet.

42. An article comprising:
a storage medium, said storage medium having stored thereon instructions, that, when executed by a machine, result in:
receiving the traffic on the network as a plurality of packets;
identifying at least one static packet in the traffic as static traffic from the plurality of packets, the static packet including an address and a static port, the address identifying a static host and the static Port being a confirmed port, including:
identifying at least one static connection to the static port on the static host in the static traffic; and
combining all of the static connections into a static connection rollup, the static connection rollup including a number of the connections to the static port on the static host;
identifying dynamic traffic from the plurality of packets; and
identifying at least one port on one host in the static traffic data and the dynamic traffic data as a communication point including the static host and the static port for at least a portion of the traffic.

43. An article according to claim 42, wherein:
identifying static traffic includes identifying at least one static packet in the traffic as the static traffic, the static packet including an address and a static port, the address identifying a static host and the static port being a confirmed port; and
identifying at least one port on one host includes identifying the static host and the static port as the communication point.

44. An article according to claim 43, wherein:
identifying dynamic traffic includes identifying at least one dynamic packet in the plurality of packets as the dynamic traffic, the dynamic packet including an address, a dynamic port, and a second port, the address identifying a dynamic host with a port mapper, and neither the dynamic port nor the second port being a confirmed port; and
identifying at least one port on one host further includes identifying the dynamic host and the dynamic port as a second communication point.

45. An article according to claim 42, further comprising generating at least one firewall rule to control traffic across a firewall coupled to the network.

46. An article according to claim 45, further comprising implementing the firewall rule in the firewall.

47. An article according to claim 45, further comprising simulating the firewall rule using the traffic on the network.

48. An article according to claim 45, further comprising:
determining a number of connections in the traffic covered by the firewall rule; and
setting a popularity for the firewall rule based on the number of connections.

49. An article according to claim 42, further comprising filtering at least one filtered packet from the traffic.

50. An article according to claim 42, wherein:
identifying dynamic traffic includes identifying at least one dynamic packet in the plurality of packets as the dynamic traffic, the dynamic packet including an address, a dynamic port, and a second port, the address identifying a dynamic host with a port mapper, and neither the dynamic port nor the second port being a confirmed port; and
identifying at least one port on one host further includes identifying the dynamic host and the dynamic port as a second communication point.

51. An article according to claim 50, wherein identifying dynamic traffic further includes:
identifying at least one dynamic connection to the dynamic port on the dynamic host in the dynamic traffic; and
combining all of the dynamic connections into a dynamic connection rollup.

* * * * *

UNITED STATES PATENT AND TRADEMARK OFFICE
CERTIFICATE OF CORRECTION

PATENT NO. : 7,444,408 B2  Page 1 of 1
APPLICATION NO. : 10/883478
DATED : October 28, 2008
INVENTOR(S) : Anand Rajavelu et al.

It is certified that error appears in the above-identified patent and that said Letters Patent is hereby corrected as shown below:

Column 14, line 53, the word "racket" should read -- packet --;
Column 17, line 16, the word "Port" should read -- port --.

Signed and Sealed this

Thirty-first Day of March, 2009

JOHN DOLL
*Acting Director of the United States Patent and Trademark Office*